United States Patent [19]
Winnie et al.

[11] Patent Number: 5,437,300
[45] Date of Patent: Aug. 1, 1995

[54] APPARATUS FOR CHANGING OUT GAS METERS

[75] Inventors: Harold R. Winnie, Kansas City; Ronald D. Bridgewater, Lee's Summit; Robert K. Kitterman, Kearney, all of Mo.

[73] Assignee: R. W. Lyall & Company, Inc., Corona, Calif.

[21] Appl. No.: 337,768

[22] Filed: Nov. 14, 1994

[51] Int. Cl.6 .............................................. F16K 43/00
[52] U.S. Cl. ........................................ 137/112; 73/201
[58] Field of Search .................... 137/112, 113; 73/201

[56] References Cited

U.S. PATENT DOCUMENTS

| | | |
|---|---|---|
| 2,579,656 | 12/1951 | Douglas et al. . |
| 3,148,690 | 9/1964 | Petersen . |
| 3,187,570 | 6/1965 | Mueller . |
| 3,245,257 | 4/1966 | Anderson . |
| 3,272,219 | 9/1966 | Frantz ................................. 137/112 |
| 3,296,861 | 1/1967 | Mueller et al. . |
| 3,444,724 | 5/1969 | Gilpin . |
| 4,293,147 | 10/1981 | Metcalfe et al. . |
| 5,042,528 | 8/1991 | England et al. . |
| 5,178,188 | 1/1993 | Russell . |
| 5,287,886 | 2/1994 | Russell ................................. 137/606 |

Primary Examiner—Robert G. Nilson
Attorney, Agent, or Firm—Fulwider Patton Lee & Utecht

[57] ABSTRACT

A bypass valve to be connected in line with a gas service line conducting gas from a gas meter to the corresponding residence or commercial building includes an open ended tubular fitting forming a flow chamber therein having a flow inlet end and a flow outlet end and an auxiliary port formed thereon to allow for access to the gas service line by an auxiliary gas source. An open ended poppet cage is mounted internally in the flow chamber and has one end thereof connected to the auxiliary port and further has a number of ports formed in the side wall thereof defining cage outlets. A poppet comprising a cylindrical center body with enlarged-in-cross section disks at the opposite ends thereof is disposed inside the poppet cage and has free axial movement therein.

12 Claims, 2 Drawing Sheets

APPARATUS FOR CHANGING OUT GAS METERS

BACKGROUND OF THE INVENTION

1. Field of the Invention

The subject invention relates to gas meter servicing of residential and commercial property and, more particularly, to a bypass valve for providing uninterrupted gas service to a residence or commercial building while the gas meter is being serviced or replaced.

2. Description of the Prior Art

Gas meters require replacing for a variety of reasons, such as due to unreliability of a particular gas meter or due to damage to a gas meter which results in its malfunction. Gas meters are also required to be changed out, regardless of their performance, after a predetermined period of time dictated by governmental regulation. The typical time period of such a required change-out typically ranges from ten to fifteen years.

These gas meter change-outs have posed a longstanding problem for gas companies in that such change-outs require the gas meter to be disconnected from the gas service line leading to, for example, the appliances in a residence. This disconnection will result in a temporary interruption of the gas flow to the corresponding residence, which will cause the pilot lights of the gas appliances in the residence to be extinguished. Normal procedure then requires a gas company employee to gain entrance to the residence and manually relight all of the pilot lights. There is therefore a need to provide a continuous gas supply to, for instance, residential appliances while the gas meter is disconnected from the gas service line. The present invention addresses such a need.

A number of devices have been proposed to provide for uninterrupted flow of gas to residential appliances while the gas meter is being serviced. By way of example, forms of such devices can be found in U.S. Pat. Nos. 3,148,690, 5,042,528, 5,178,188, and 5,287,886.

The above mentioned prior devices, while intended to provide continual gas flow, all suffer some disadvantage. For example, one such method described in U.S. Pat. No. 3,148,690, commonly referred to as the Grunsky method, employs a plastic bag to be fitted over a tee connecting the meter to the gas service line which conducts gas to the residence. A plug in the uncoupled end of the tee is removed, and an external cylinder must be moved through the bag to be connected to the tee in order to allow access for an external gas source to inject gas into the gas service line. This method has proven to be time-consuming, painstaking, and expensive.

Another method illustrated in the above-mentioned prior devices is to access the uncoupled end of a tee and manually drive a seal through the tee to seat against the end of the tee leading to the gas meter thereby sealing off the gas meter while providing gas from an external gas source. This method is time consuming and allows for momentary gas escape when the uncoupled end of the tee is initially unplugged thus resulting in a temporary lapse in gas supply to the appliances, which will serve to extinguish the associated pilot lights.

Yet another method set forth in the prior devices, although new and not commonly accepted, is described in U.S. Pat. No. 5,178,188, in which a sleeve having a side port formed thereon is placed vertically in-line with the gas service line on the customer's side of the gas meter. Disposed within the sleeve adjacent the lower end is a ball check valve that has placed therein a ball which is free to move within the ball check valve. Thus when gas is flowing into the lower end of the sleeve, the ball is repelled from the lower end and the gas will flow around the ball and downstream to the appliances in the corresponding residence. When an external source is connected to the side port and begins to inject gas into the sleeve, then the gas meter supply may be shut off and, due to gravity, the ball will fall toward and contact and seal the lower end such that gas will flow from the external source to the appliances, while the gas meter may be disconnected from the gas service line. This method has several limitations, however. In the first place, the sleeve must be situated in a vertical orientation in order to function properly, due to the fact that it requires gravity in order to have the ball drop toward and effectively seal the lower end. Secondly, the ball is continually driven into the ball check valve walls which over time will alter its shape and thus its effectiveness in sealing the lower end. Such alteration will require replacement of either the ball or of the entire sleeve thus causing a lapse in gas flow to the appliances which will serve to extinguish the pilot lights thereof, which is the exact problem such a device is implemented to alleviate. Also, the sleeve has a separate mechanism to keep gas which flows into the lower end from flowing out of the side port, which means that the external plug provided to seal the side port may be removed by unauthorized individuals and gas may be withdrawn and thereby stolen from gas service lines through such a device.

As such, it may be appreciated that there continues to be a need for an apparatus which will allow for the disconnecting of the gas meter from the gas service line leading to the corresponding residence while never interrupting the gas flow to the residence, and which furthermore may be used in any orientation, will be long lasting, and which will not create an access means for unauthorized withdrawal of gas. The instant invention addresses such needs.

SUMMARY OF THE INVENTION

Briefly and in general terms, the present invention provides a bypass valve apparatus to be connected in-line with the gas service line leading to an establishment such as a residence or commercial building. The invention is directed to an apparatus which allows for the gas meter to be replaced or serviced while the corresponding residence continues to receive a supply of gas. In accordance with the invention, the bypass valve of the present invention includes an in-line tubular fitting formed with an interior flow chamber to accommodate flow of gas from a gas meter to the gas service line connected to the gas distribution tubing of the corresponding residence. An auxiliary port is machined through the tube side wall, thereby allowing an auxiliary gas source to access the gas service line through the auxiliary port. An open ended, generally cylindrical poppet cage is concentrically affixed in the interior flow chamber of the tube. The one end of the poppet cage adjacent the upstream flow inlet end of the tube defines a primary gas inlet, while the opposite end of the cage is connected to the auxiliary port by means of an auxiliary fitting disposed within the interior flow chamber of the tube, such opposite end defining an auxiliary gas inlet. The poppet cage has ports machined in the arcuate side walls thereof which define cage outlets for gas entering the poppet cage. A spool shaped poppet is floatably carried in the poppet cage for free axial movement therein and is formed having a predetermined configuration so that it may seal either the primary or auxiliary inlet. During normal operation, the gas meter will supply gas to the gas service line leading to the gas distribution tubing of the appliances in the corresponding residence. This gas enters the poppet cage through the primary inlet. The gas pressure drives the poppet away from the primary inlet to seal the auxiliary inlet. The gas then flows through the cage outlets and downstream through the flow chamber to the appliances of the residence. When the gas meter needs to be serviced, an auxiliary gas source is coupled to the auxiliary port of the tube. The auxiliary gas source is then activated, which introduces a gas flow through the auxiliary port which flows upstream through the auxiliary fitting to the auxiliary inlet, such gas driving the poppet past the cage outlets to seal the primary inlet thereby sealing the gas meter off from the gas service line to the residence. This auxiliary gas then flows through the cage outlets and downstream to the appliances of the residence. The gas meter may then be serviced or removed without any interruption of the gas flow to the residence.

Other features and advantages of the invention will become apparent from the following detailed description, taken in conjunction with the accompanying drawings which illustrate, by way of example, the features of the invention.

DETAILED DESCRIPTION OF THE PREFERRED EMBODIMENT

Figure 1:
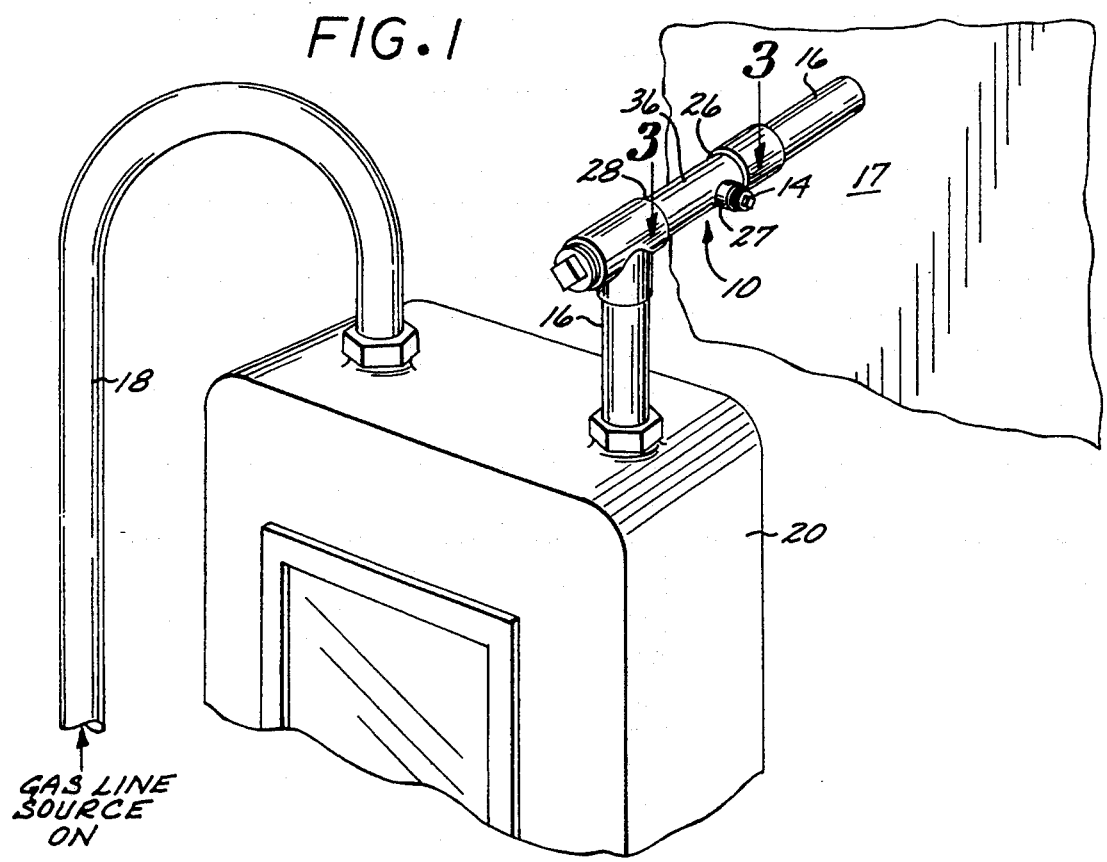
FIG. 1 is a perspective view of a bypass valve embodying the present invention connected in series with the gas service line leading to gas distribution tubing in a residence.
Figure 2:
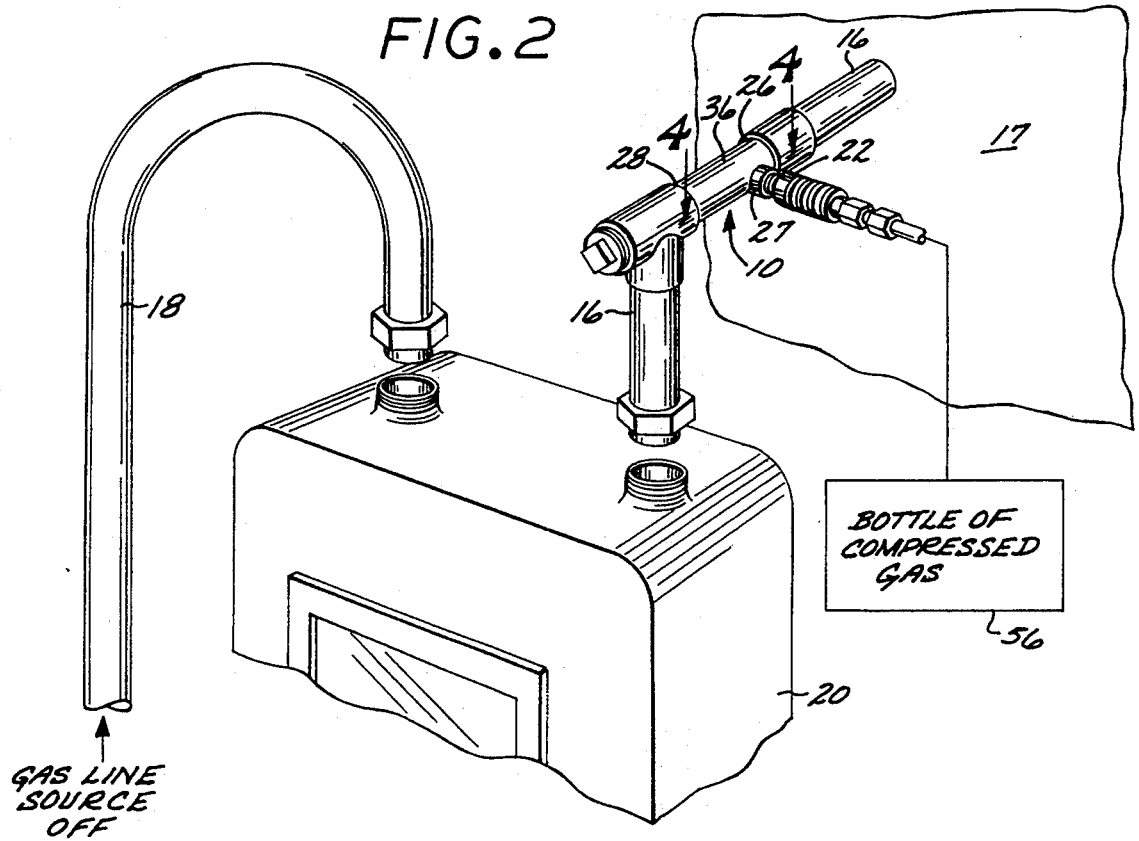
FIG. 2 is a perspective view similar to FIG. 1 but showing an auxiliary gas supply coupled to the bypass valve and the gas meter disconnected from the gas service
Figure 3:
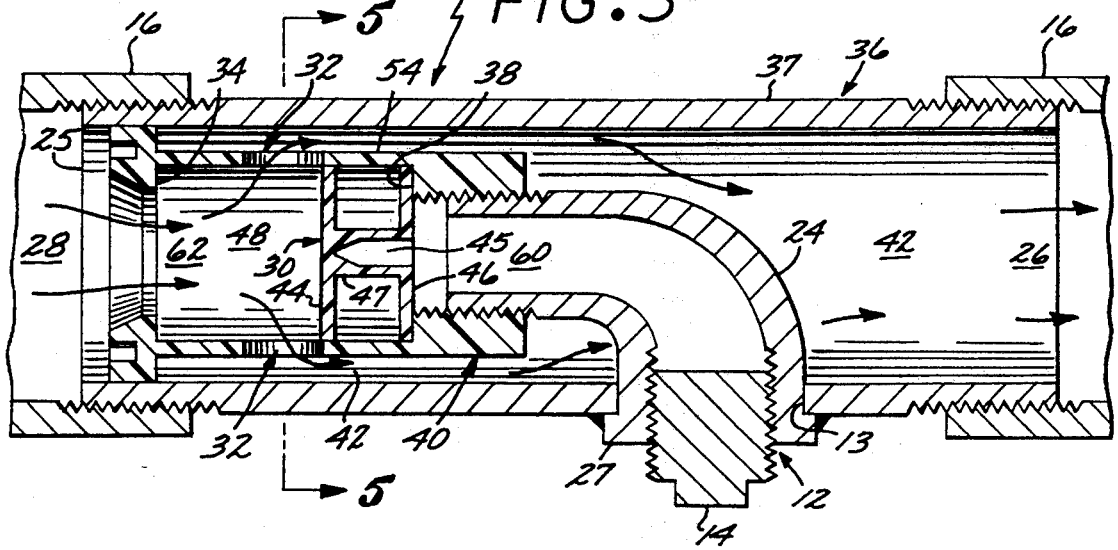
FIG. 3 is a partial longitudinal sectional view, in enlarged scale, taken along the line 3—3 of FIG. 1.
Figure 4:
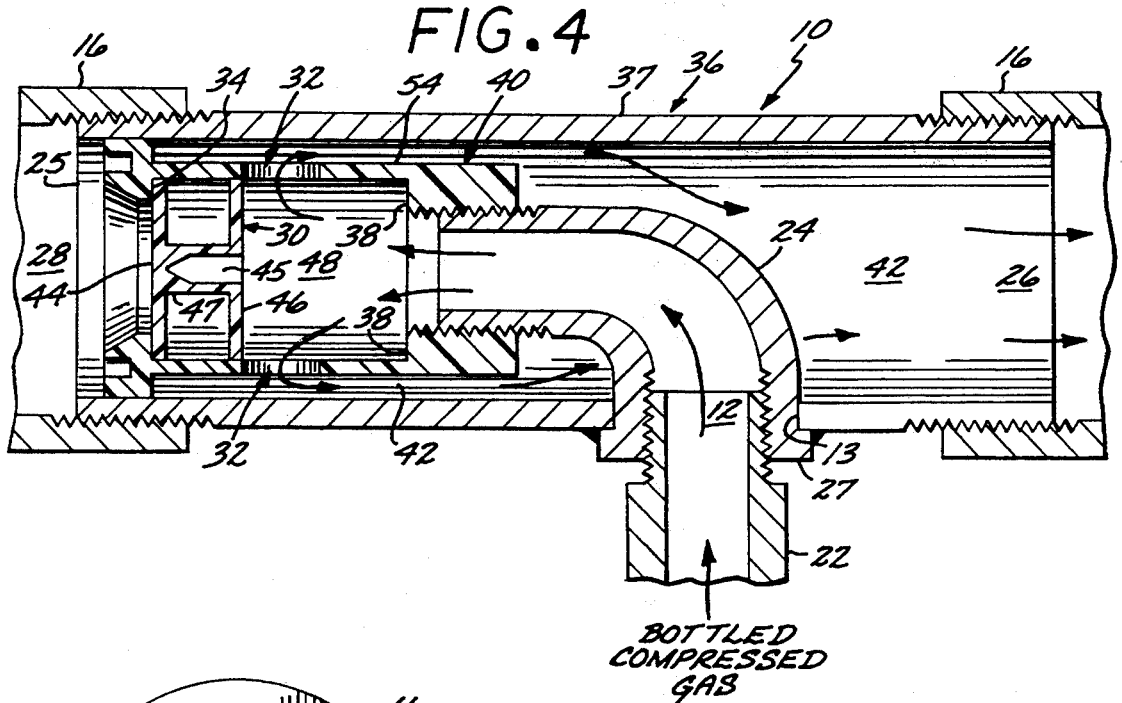
FIG. 4 is a partial longitudinal sectional view, in enlarged scale, taken along the line 4—4 of FIG. 2.

In the following detailed description, like reference numerals will be used to refer to like or corresponding elements in the different figures of the drawings. Referring now to the drawings, and particularly to FIG. 1, there is shown generally the bypass valve apparatus 10 of the present invention connected in-line with a gas service line 16 leading from a gas meter 20 to the gas tubing of a corresponding residence or commercial building 17. Referring to FIG. 3, the bypass valve includes an open ended elongated tube 36 having an upstream flow inlet end 28 and a downstream flow outlet end 26, and defines a flow chamber 42 therein. An auxiliary port 12 is formed in the side wall of the tube to provide access to the gas service line to an auxiliary gas source 56. An open ended, generally cylindrical spool poppet cage 40 defining a poppet chamber 48 therein is mounted inside the tube and has one end adjacent the upstream flow inlet defining a primary inlet 62 and the opposite end defining an auxiliary inlet 60 (FIGS. 3 and 4). The diameter of the outside wall of the poppet cage is smaller than that of the inner face of the tube such that the flow chamber encompasses the poppet cage and assumes an annular configuration therealong. The poppet cage has a number of ports formed in the side walls 54 thereof, such ports defining cage outlets 32 for gas flowing into the poppet cage. An auxiliary fitting 24 is disposed inside the tube and is connected at one end to the auxiliary port and at the other end to the auxiliary inlet thereby allowing for the communication of gas between the auxiliary port and the auxiliary inlet. A spool shaped poppet 30 comprising a cylindrical center body 47 carrying a pair of oppositely disposed disks 44 and 46 is disposed within the poppet cage, and is floatably contained therein to allow for free axial movement within the poppet cage so that when gas enters the poppet cage through the primary inlet, the poppet is floatably driven toward and seals the auxiliary inlet, thereby allowing the gas to flow through the cage outlets and downstream through the flow chamber to the appliances of the residence, and further so that when the auxiliary gas source is connected to the auxiliary port and is activated auxiliary gas is injected and flows upstream to the auxiliary inlet thereby driving the poppet toward and sealing off the primary inlet to allow the auxiliary gas to flow through the cage outlets and downstream to the appliances of the residence, while further allowing for the gas meter to be disconnected from the gas service line without any interruption of gas flow to the appliances.

The elongated tube 36 may be formed of malleable iron and is generally cylindrical in shape in the preferred embodiment and has a cross sectional diameter of normal pipe sizes to allow for a similar amount of gas to flow through the flow chamber 42 as that which flows through the gas service line 16. The tube may be externally threaded at the upstream flow inlet and downstream flow outlet, 28 and 26, respectively, to allow for engagement with the threaded ends of the gas service line (FIGS. 3 and 4).

The auxiliary port 12 comprises a bore 13 which is machined into the tube side wall 37 (FIG. 3). The auxiliary fitting 24 may be embodied as a street ell and may be formed of malleable iron. The auxiliary fitting is generally disposed within the flow chamber and has one end extending through the bore, such end terminating in an internally threaded annular ring 27 which seats on the exterior surface of the tube side wall. The other end of the auxiliary fitting is externally threaded and engages the internally threaded auxiliary inlet 60, thereby creating an auxiliary gas flow path from the auxiliary port upstream to the auxiliary inlet. The threaded annular ring is internally threaded for engagement with either a threaded plug 14 to seal the auxiliary port during normal operation of the gas meter (FIG. 3), or with a threaded coupling 22 leading to an auxiliary gas source 56 (FIG. 4), such that when the gas meter requires servicing or replacing the gas introduced into the bypass valve by the auxiliary gas source is directed upstream to the auxiliary inlet.

Figure 5:
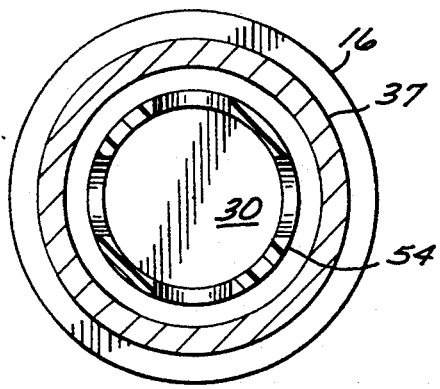
FIG. 5 is a transverse sectional view taken along the line 5—5 of FIG. 3.

The poppet cage 40 is formed of a plastic in the preferred embodiment, such as Solvay K38, and is maintained in suspended position within the elongated tube 36 by means of an annular mounting ring 25 which is mounted internally on the tube adjacent the flow inlet 28. The annular mounting ring projects into the flow chamber and has a generally frusto conical central passage, the mounting ring terminating in an annular auxiliary seat 34 having a central opening with a diameter smaller than the diameter of the poppet 30 which operates to impede further movement of the poppet. The one end of the poppet cage defining the primary inlet attaches to the inwardly projecting face of the annular mounting ring such that the poppet cage is suspended therefrom and extends toward the center of the tube, thereby providing a gas flow path extending through the mounting ring and into the poppet chamber 48. The mounting ring and poppet cage cooperate to direct the gas entering the bypass valve through the upstream flow inlet to travel through the primary inlet and into the poppet chamber. The cross sectional diameter of the poppet cage is smaller than the inside diameter of the tube such that, with the poppet cage in its suspended position inside the tube, the flow chamber assumes an annular configuration between the arcuate poppet cage wall 54 and the arcuate tube wall 37 thereby creating a gas flow path from the cage outlets 32 downstream to the downstream flow outlet 26 (FIG. 5).

The poppet 30 is formed of a plastic in the preferred embodiment, such as Solvay K38, and is formed with a generally cylindrical center body 47 terminating in enlarged-in-cross section first and second disks, 44 and 46 respectively, at the opposite ends thereof, the first disk defining a primary inlet plug and the second disk defining an auxiliary inlet plug. The poppet is floatably contained within the poppet chamber 48 for free axial movement therein (FIG. 3). The auxiliary inlet plug has a bore 45 formed centrally thereon which projects from one side of the center body nearly through to, but short of, the other side, thereby decreasing the mass of the poppet such that the gas pressure required to drive the poppet through the poppet cage is proportionally reduced. The typical gas pressure in the gas service line on the customer's side of the gas meter is on the order of 0.25–5 psi. The poppet is formed having a sufficiently small mass such that gas pressures on the order of 0.25–5 psi are sufficient to drive the poppet through the poppet cage regardless of the relative orientation of the bypass valve. The primary inlet plug and the auxiliary inlet plug have diameters of similar predetermined size such that the poppet may have free axial movement within the poppet cage while simultaneously cooperating with the arcuate poppet cage wall 54 to impede gas flow through the poppet chamber past the respective plugs. The center body has a reduced-in-cross section diameter to reduce the surface area of the poppet that contacts the poppet cage wall, such that the amount of pressure required to drive the poppet is substantially reduced, so that the typical pressures of 0.25–5 psi suffice to drive the poppet through the poppet cage. An annular auxiliary seat 34 defines the inner extremity of the mounting ring 25 and has a sufficiently small opening such that the primary inlet plug of the poppet stops and seals thereagainst (FIGS. 3 and 4). An annular flow seat 38 is formed inwardly on the poppet cage adjacent the auxiliary inlet 60 and has a sufficiently small opening such that the auxiliary inlet plug of the poppet stops and seals thereagainst.

The cage outlets 32 are formed in the arcuate poppet cage side wall 54 and have a circular configuration in the preferred embodiment, but may also be formed as squares, rectangles or any such shape. The cage outlets are disposed in an annular configuration at a predetermined position on the poppet cage side wall such that the cage outlets are completely exposed when the poppet 30 is driven to either end of the poppet chamber 48. The cage outlets have sufficiently large cross sectional areas such that the rate of gas flow toward the residence or commercial building is not impeded.

The bypass valve 10 of the present invention will operate regardless of its relative orientation, whether it be horizontally or vertically situated. The poppet does not require gravity in order to seal either the primary inlet or the auxiliary inlet but rather is driven to seal the respective inlets by the gas pressures present within the poppet chamber, and thus the bypass valve may be connected in-line with the gas service line in either a horizontal section of the gas service line or in a vertical section thereof.

The bypass valve 10 also is designed to prevent any withdrawal of gas through the auxiliary port 12. When the gas meter is connected to the gas service line and is supplying gas thereto, the auxiliary inlet plug is seated against the annular flow seat 38, thereby sealing off the auxiliary inlet. Thus even if one were to remove the threaded plug 14 and attempt to extract gas through the side port, the poppet seals off the auxiliary inlet and will not allow any gas to flow through the auxiliary fitting and out the auxiliary port. Thus the auxiliary port is designed to flow gas in only one direction, namely into the bypass valve. The threaded plug is, therefore, not required as gas cannot exit the bypass valve through the auxiliary port. It is used primarily to keep undesirable contaminants from entering the auxiliary fitting.

The poppet 30 is held in continual axial alignment within the poppet cage and only moves therein when the gas meter is removed from or re-connected to the gas service line, which occurs infrequently. Therefore, the poppet is generally held in a stationary and secure position within the poppet cage and will be subjected to only minimum surface wear as it is shifted within the chamber to thereby extend the service life.

In operation, the bypass valve 10 is connected in line with the gas service line 16 by means of the externally threaded upstream flow inlet 28 and downstream flow outlet 26 which are mated with corresponding internally threaded extremities on the gas service line (FIG. 3). The auxiliary port 12 is sealed during normal operation of the gas meter by means of the threaded plug 14, which engages the threaded annular ring 27, thereby effectively sealing the auxiliary port (FIGS. 1 and 3). Gas from the gas service line may then flow through the bypass valve and downstream to the appliances in the corresponding residence or commercial building, as now described in detail. Gas flows through the primary inlet 62 and contacts the primary inlet plug 44, which is thereby driven toward the auxiliary inlet 60 of the poppet cage 40. The auxiliary inlet plug 46 contacts and seats on the annular flow seat 38, thereby sealing off the auxiliary inlet. The cage outlets 32 are disposed on the poppet cage at a predetermined distance from the respective ends thereof such that when the poppet seats against the annular flow seat, the cage outlets are completely exposed to the gas flowing into the poppet chamber. The gas in the poppet chamber is then driven out of the poppet chamber through the cage outlets and into the annular portion of the flow chamber (FIG. 5). Gas then flows downstream through the flow chamber and out the downstream flow outlet 26 to the appliances of the corresponding residence. Gas will continue to flow through the bypass valve in this manner while the gas meter is connected to the gas service line 16.

When it becomes time to replace the gas meter, the threaded plug 14 is disengaged from the threaded annular ring 27, thereby exposing the auxiliary port 12. The threaded coupling 22 is then threadably engaged to the threaded annular ring 27 to create a gas flow path from the auxiliary gas source 56 through the auxiliary fitting 24 and upstream to the auxiliary inlet 60. The auxiliary gas source is then activated, thereby introducing a gas flow through the auxiliary port which flows upstream to the auxiliary inlet where it comes into contact with the auxiliary inlet plug 46 of the poppet 30 which is still in its normal position seated against the annular flow seat 38. This auxiliary gas flow is initially increased to have a higher pneumatic pressure than the typical 0.25-5 psi of pressure created by the gas flow entering the primary inlet 62 from the gas meter, such that the corresponding pressure applied to the auxiliary inlet plug will be greater than the pressure applied to the primary inlet plug, which will thereby drive the poppet toward the primary inlet 62 (FIG. 4). The primary inlet plug then contacts the annular auxiliary seat 34 and seats thereagainst to effectively seal off the gas meter from the gas service line leading to the appliances of the corresponding residence or commercial building. With the poppet seated against the annular auxiliary seat, the cage outlets 32 are then completely exposed to the gas flowing into the poppet chamber from the auxiliary source. The gas from the auxiliary source is then driven through the exposed cage outlets and downstream through the annular portion of the flow chamber and out the downstream flow outlet 26 to the appliances of the corresponding residence. The gas meter may then be disconnected from the gas service line because the poppet will continue to seal off the upstream flow inlet so that the auxiliary gas is driven out through the cage outlets and to the appliances of the residence or commercial building.

When the replacing of the gas meter has been completed, the new gas meter may then be connected to the gas service line 16. The gas flow through the gas service line 16 may then be resumed. The flow of gas from the auxiliary gas source is then manually decreased such that the pressure applied to the primary inlet plug 44 by the gas flowing from the gas meter is greater than the pressure applied to the auxiliary inlet plug 46 from the auxiliary source, which will drive the poppet toward the auxiliary inlet 60 to resume its normal position seated against the annular flow seat 38, thereby sealing off the auxiliary source 56 from the gas flow path. Gas then flows into the poppet chamber 48 and through the cage outlets 32 toward the downstream flow outlet 26. The coupling 22 may then be disengaged from the annular ring 27 and the threaded plug 14 replaced in engaged relation with the annular ring to effectively seal the auxiliary fitting thereby keeping undesirable contaminants from entering the auxiliary fitting.

From the foregoing, it will be appreciated that the bypass valve apparatus of the present invention provides a continuous supply of gas to a residence or commercial building while the corresponding gas meter is disconnected from the gas service line leading to the residence or commercial building. The bypass valve is easy to use and does not require a time-consuming procedure to be followed in order to provide a continuous gas supply to a residence or commercial building.

While a particular form of the invention has been illustrated and described, it will also be apparent that various modifications can be made without departing from the spirit and scope of the invention. Accordingly, it is not intended that the invention be limited, except as by the appended claims.

What is claimed is:

1. A bypass valve to be connected in line with a gas service line from a gas meter comprising:
   an elongated tubular housing formed with a flow chamber therein having at one end a flow inlet and at its opposite end a flow outlet and including a side wall formed with an auxiliary port;
   a poppet cage mounted in said flow chamber and defining a poppet chamber therein and formed on one end adjacent said flow inlet with an annular auxiliary seat facing toward said flow outlet and on its opposite end with an annular flow seat facing toward said auxiliary seat and including a cage wall formed with a cage outlet spaced from said seats, said cage being connected on its end opposite said one end with said auxiliary port for communicating gas flow from said port into said cage; and
   a poppet received floatably in said poppet chamber to be, when said flow inlet is pressurized to a predetermined pressure, driven floatably in said poppet chamber against said flow seat to direct gas flow out said cage outlet and, when said auxiliary port is pressurized with gas to a selected pressure, greater than said predetermined pressure, be driven floatably in said poppet chamber against said auxiliary seat to direct gas flow from said auxiliary port out said cage outlet.

2. The bypass valve of claim 1 wherein:
   said poppet comprises a generally cylindrical center body stem and a pair of enlarged-in-cross section disks disposed at the opposite longitudinal ends of said center body stem.

3. The bypass valve of claim 1 wherein:
   said poppet cage is connected at said opposite end to said auxiliary port by means of an elbow fitting.

4. The bypass valve of claim 1 that includes:
   an annular mounting ring attached inwardly on said tube adjacent said inlet end, said mounting ring to suspend said poppet cage therefrom.

5. The bypass valve of claim 1 wherein:
   said flow inlet and flow outlet are externally threaded for engagement with the gas service line.

6. The bypass valve of claim 1 wherein:
   said poppet cage is generally cylindrical in shape.

7. The bypass valve of claim 1 wherein:
   said elongated tubular housing is generally cylindrical in shape.

8. The bypass valve of claim 1 wherein:
   said poppet includes a first enlarged-in-cross section disk configured to form a gas tight seal with said annular flow seat, and a second enlarged-in-cross section disk configured to form a gas tight seal with said annular auxiliary seat.

9. The bypass valve of claim 3 wherein:
   said elbow fitting extends through said auxiliary port and terminates in an internally threaded annular ring disposed on the exterior surface of said elongated tubular housing and said annular ring to allow for coupling to an auxiliary gas source.

10. The apparatus of claim 9 that includes:
    a threaded plug to engage said annular ring.

11. The apparatus of claim 1 wherein:
    said cage outlet comprises a plurality of bores formed on said cage wall in an annular configuration at a predetermined position thereon.

12. A meter bypass valve for connection to an auxiliary gas source comprising:
    an elongated tubular housing formed with a flow chamber having at one end an upstream inlet and at the opposite end a downstream outlet, said housing including a side wall with an auxiliary port;

an elongated poppet cage mounted in said flow chamber and defining a poppet chamber therein, said poppet cage having formed thereon at one end adjacent said upstream inlet an annular auxiliary seat facing toward said downstream outlet and defining a flow inlet, said poppet cage being further formed with a side wall defining a cage outlet for directing gas from said poppet cage outwardly into said flow chamber;

an auxiliary fitting leading from said auxiliary port to said poppet cage; and a floating spool poppet in said poppet cage, said poppet formed with a cylindrical center body stem and first and second enlarged-in-cross section disks disposed at the opposite longitudinal ends of said center body stem, said spool poppet to be operative upon application of a gas at a selected pressure applied to said spool poppet to float said spool poppet in said poppet cage to engage said first enlarged-in-cross section disk with said auxiliary seat to block gas flow from said poppet cage to said upstream inlet while directing gas flow from said poppet cage out said cage outlet toward said downstream outlet.

* * * * *